United States Patent [19]

Jonsson

[11] 3,825,719
[45] July 23, 1974

[54] CONTACT NOZZLE FOR A CONTINUOUS ARC WELDING ELECTRODE

[75] Inventor: Sven Jonas Roland Jonsson, Laxa, Sweden

[73] Assignee: Elektriska Svetsningsaktiebolaget, Gothenburg, Sweden

[22] Filed: June 18, 1973

[21] Appl. No.: 371,310

[30] Foreign Application Priority Data
June 22, 1972 Sweden .......................... 8287/72
Dec. 19, 1972 Sweden .......................... 16597/72

[52] U.S. Cl................ 219/130, 219/136, 339/9
[51] Int. Cl. ......................................... B23k 9/00
[58] Field of Search ........ 219/74, 136, 130; 339/9, 339/35

[56] References Cited
UNITED STATES PATENTS

| | | | |
|---|---|---|---|
| 2,184,335 | 12/1939 | Chapman | 219/136 |
| 2,347,646 | 5/1944 | Smith | 219/136 |
| 2,899,667 | 8/1959 | Bredtschneider et al. | 339/9 E |
| 2,900,489 | 8/1959 | Keener | 219/136 |
| 2,981,825 | 4/1961 | Rundell | 219/136 |
| R26,549 | 3/1969 | Cary | 219/74 |

*Primary Examiner*—J. V. Truhe
*Assistant Examiner*—Clifford C. Shaw
*Attorney, Agent, or Firm*—Cameron, Kerkam, Sutton, Stowell & Stowell

[57] ABSTRACT

A contact nozzle for supplying welding current to a continuous, fusible arc welding electrode in which a pneumatic cylinder or other resilient means maintain a contact member in engagement with an electrode backed on the opposite side by a wear-resistant, electrically nonconducting or poorly conducting backing member.

3 Claims, 9 Drawing Figures

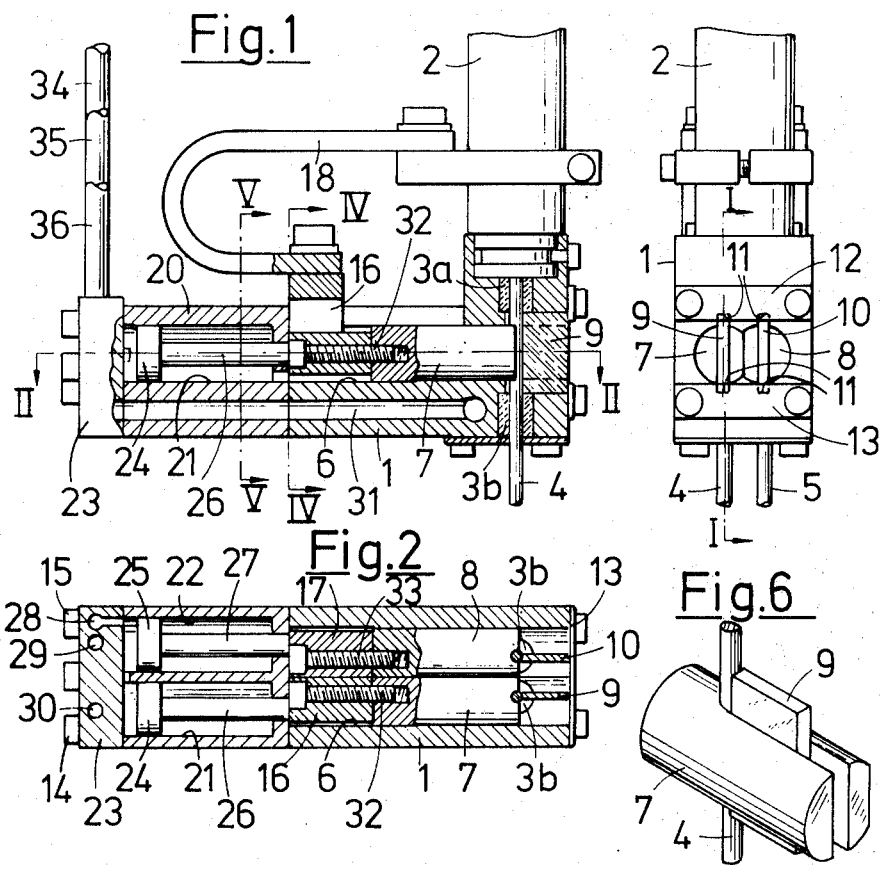

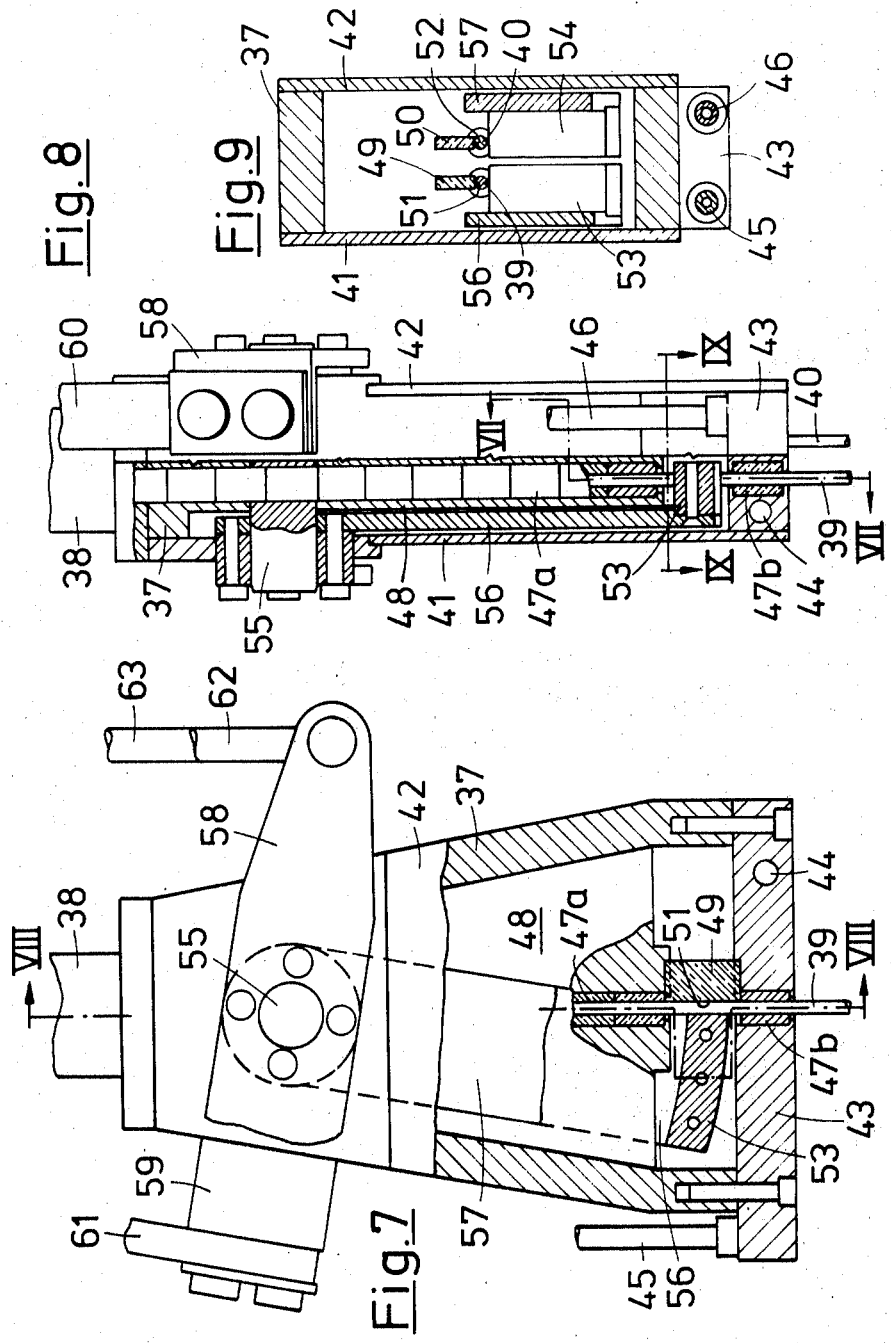

CONTACT NOZZLE FOR A CONTINUOUS ARC WELDING ELECTRODE

BACKGROUND OF THE INVENTION

This invention relates to automatic arc welding and more particularly to an improved contact nozzle for supplying welding current to a continuous, fusible arc welding electrode.

In automatic arc welding, for instance submerged arc welding or gas-shielded arc welding, the fusible welding electrode is advanced automatically by a wire-feeding device which pushes the electrode through a guide and contact device generally referred to as a "contact nozzle." Said contact nozzle serves to supply welding current to the electrode by means of a contact member slidingly engaging the electrode and also serves to direct the electrode tip towards the welding spot. Said contact member is subjected to rapid wear caused by the sliding engagement with the electrode combined with the heating and the spark corrosion caused by the passage of the current from the contact member to the electrode. To ensure a satisfactory contact action in spite of said wear, several known contact nozzle designs include a special spring-actuated pressure shoe or other resilient means arranged to urge the electrode laterally towards the stationary contact member. The increase of the useful life of the contact member obtainable in this way is, however, rather limited, as the contact member anyhow has to be replaced before the geometry of the electrode path through the nozzle has been modified too much through the wear of the contact member. For contact nozzles working under heavy-duty conditions (large welding currents and long welding runs) causing rapid wear, the resulting need for frequent replacing of the contact member is a serious practical disadvantage.

BRIEF SUMMARY OF THE INVENTION

The invention provides an improved contact nozzle in which the wear of the contact member neither impairs the contact action nor modifies the geometry of the nozzle. To accomplish this, the contact nozzle according to the invention comprises a body or housing, a stationary electrode backing member secured in said body or housing and having a front face for sliding engagement with the electrode, said backing member consisting of a wear-resistant, electrically nonconducting or poorly conducting material, a movable contact member, means supported by said body or housing for guiding said movable contact member towards the front face of said stationary backing member, electric conductor means for sypplying welding current to said contact member, including a flexible conductor member connected to said movable contact member, and biasing means for urging said contact member towards said backing member.

The term "poorly conducting" should be understood to indicate an electrical conductivity not exceeding one-tenth of the electric conductivity of copper.

Other features and advantages of the invention will be apparent from the following description of embodiments of the invention with reference to the accompanying drawings.

BRIEF DESCRIPTION OF THE DRAWINGS

FIG. 1 depicts a twin welding nozzle, constituting a first preferred embodiment of the invention, represented in elevational view and partly in vertical section (taken along I—I of FIG. 3), FIG. 2 is a horizontal section taken along II—II of FIG. 1, FIG. 3 is a front elevational view of the twin nozzle (viewed from the right in FIG. 1), FIGS. 4 and 5 are sectional views taken along IV—IV and V—V of FIG. 1, respectively, FIG. 6 is a perspective view of some details of the nozzle of FIG. 1, FIG. 7 depicts a twin welding nozzle, constituting a second preferred embodiment of the invention, represented in elevational view, with some parts shown in section (along VII—VII of FIG. 8), FIG. 8 is a front elevational view of the twin nozzle (viewed from the left in FIG. 7), with some parts shown in section along VIII—VIII of FIG. 7, and FIG. 9 is a sectional view taken along IX—IX of FIG. 8.

DETAILED DESCRIPTION OF THE PREFERRED EMBODIMENTS

In FIGS. 1 to 6, inclusive, a first preferred embodiment of the invention is depicted. The twin nozzle represented has a body or housing 1 attached to the lower extremity of an electrically conducting tube 2 supported at its upper extremity by a frame or chassis (not shown) provided with mechanism for advancing a pair of wire electrodes 4, 5 towards the contact nozzle through the tube 2. Each of the electrode wires is guided by a pair of guide bushings fitted into the body 1, to wit, an upper bushing 3a and a lower bushing 3b, both of which consist of a heat and wear resistant material, for instance sintered alumina. A pair of rod-shaped contact members 7, 8 for the wires 4, 5, respectively, are movable at right angles to the wires in a common guide channel 6 in the body 1. The contact members 7, 8 each have a circular cross-section apart from a flattened portion at which the contact members engage one another (FIG. 3). The part of the channel 6 which extends between the outer wall of the body 1 and the wires 4, 5 is provided with grooves 11 into which are fitted two backing members 9, 10, each of which consists of a slab of sintered alumina. A pair of detachable strips 12, 13 serves to retain the backing members 9, 10 in the position shown in which the inner edge or face of the backing member 9, 10 engages the wire 4, 5, respectively, extending between the upper and lower guide bushings 3a, 3b. The contact members 7, 8 are each joined to a contact lug 16, 17, respectively, connected by a flexible conductor 18, 19, respectively, to the tube 2, which is connected to one terminal of a welding power supply.

A cylinder block 20 attached to the nozzle body 1 by means of a pair of screws 14, 15 contains a pair of cylinders 21, 22 with a common head 23. The pistons 24, 25 displaceable in the cylinders 21, 22 exert a pressure on the contact members 7, 8 by means of piston rods 26, 27 engaging the contact lugs 16, 17. Compressed air is supplied to the pressure chambers of the cylinders through a channel 28 in the cylinder head 23 connected to a supply conduit 34. The cylinder head is also provided with a pair of bores 29, 30 connected at their upper extremities to the supply conduit 35 and the return conduit 36 of a water-cooling system. The lower extremities of said bores are connected by a coolant channel 31 provided in the cylinder block 20 and the nozzle body 1.

The contact members 7, 8 engage the electrode wires 4, 5 with a constant force provided by the pistons 24, 25, respectively. The contact faces of the contact member may originally be plane, or they may each be provided with a groove having a semicircular or circle segment shaped crosssection for the electrode 4, 5, respectively (FIG. 2). The wear effected by the electrode wires will gradually increase the depth of said grooves, causing the contact member to straddle the electrode 4, 5 and the backing member 9, 10. FIG. 6 shows one contact member 7 with the electrode 4 and the backing member 9 after an extended period of operation. The wear of the contact member causes no change of the position of the electrodes with respect to the nozzle body, said position being determined by the backing member 9, 10, respectively, and the guide bushings 3a, 3b.

The front faces of the backing members 9, 10 may be grooved in order to assist the guiding action of the bushings 3a, 3b, and to distribute the pressure exerted by the wire upon the backing member.

The contact members may consist of plain copper, or they may consist of a copper alloy having a wear resistance exceeding the one of plain copper, for instance copper alloyed with a small proportion of beryllium or zirconium. The useful life of the contact member is proportional to the wear length, or useful length, of the contact member (that is, the depth to which the wear can be allowed to penetrate into the contact member). The invention principally envisages the use of a wear length of at least 40 mm; space considerations may, however, sometimes necessitate the use of a wear length as small as 10 mm.

The amount of wear produced on the backing members 9, 10 during the lifetime of the contact members (which may be a full working day, or several working days) is usually negligible. When required, they can easily be replaced after removal of the strips 12, 13. Replacement of the contact members 7, 8 is carried out by unscrewing the screws 14, 15 to detach the cylinder block from the nozzle body 1, pulling back the contact lugs 16, 17 and the contact members 9, 10, unscrewing the screws 32, 33 securing the contact members to the contact lugs, attaching a new pair of contact members, and reassembling the unit.

The use of an individual pneumatic cylinder for each of the contact members guarantees well-defined contact conditions for each of the electrodes. Moreover, the contact nozzle can, when required, be used for welding with a single electrode without any readjustment of the pressure of the compressed air. The contact members are efficiently cooled by the cooled wall of the guide channel 6 engaging the comparatively large cylindrical surfaces of the contact members. Protection from spatter can, if required, be effected by fitting a screen of asbestos board with a pair of holes for the electrodes to the underside of the nozzle.

FIGS. 7 to 9 depict the second preferred embodiment of the invention. A nozzle body or housing 37 is attached to the lower extremity of a tube 38 supported at its upper extremity by a frame or chassis (not shown) provided with mechanism for the advancement of a pair of wire electrodes 39, 40. The nozzle housing 37 is provided with a pair of detachable side plates 41, 42 and a bottom piece 43 provided with a channel 44 connected to a cooling-water inlet line 45 and a cooling-water outlet line 46.

Each of the electrode wires passes through a series of bushings 47a fitted in the nozzle housing 37 and a bushing 47b fitted in the bottom piece 43, said bushings consisting of a material resistant to heat and wear, for instance sintered alumina. A pair of backing members 49, 50 for the electrodes 39, 40 are fitted between the bottom piece 43 and a web portion 48 of the housing in such a position that the front faces 51, 52 of the backing members are aligned with the electrode passageways formed by the bushings 47a, 47b. Each of the backing members consists of a slab of sintered alumina or another wear-resistant and electrically insulating or poorly conducting material. The thickness of the slab must not exceed the electrode diameter.

A pair of contact members 53, 54 are each attached to the lower extremity of an arm 56, 57, respectively, rotatably supported by an axle 55 force fitted into the web 48. Each of the arms is rigidly connected with a lever 58, 59, respectively. Each of the levers 58, 59 is connected at one end with a flexible welding current conductor 60, 61, respectively, and at the other end with a link 62, 63 operated by a compressed-air cylinder (not shown). The welding current conductors 60, 61 are connected to one terminal of a common welding power supply. The arms 56, 57 and the levers 58, 59 preferably consist of copper. The contact members 53, 54 consist of a wear-resistant alloy having a low electrical resistivity, preferably copper alloyed with a small proportion of beryllium or zirconium.

The width of the contact members 53, 54 being considerably larger than the electrode diameter, the electrodes will by and by cut into the contact members so as to shape deep grooves the walls of which extend along and beyond the backing members (cf. FIG. 6).

The electrode wires referred to in the above examples have a circular cross-sectional shape and may consist either of a massive wire or of a tubular metallic sheath enclosing a compacted powder core. The invention also includes nozzles for strip electrodes, in which the contact member engaging the strip electrode preferably has a width equal to or slightly less than the width of the strip.

I claim:

1. Apparatus for arc welding with a continuous, fusible electrode comprising a frame having means for defining an electrode passageway, said means including a stationary backing member consisting of a slab of wear-resistant, electrically nonconducting or poorly conducting material secured in said frame and having a straight front face slidingly engaging the electrode, a length of electrode extending through said passageway, said electrode having a width at least equal to the width of said backing member, a movable contact member having a width substantially exceeding the width of the electrode, means for guiding said movable contact member towards the front face of said stationary backing member, electric conductor means for supplying welding current to said contact member, including a flexible conductor member connected to said movable contact member, and biasing means comprising a pressure fluid operated cylinder for urging said contact member towards said backing member, said movable contact member being capable of wear to a depth substantially exceeding the thickness of the electrode, such wear causing the movable contact member to straddle the electrode and the backing member.

2. A contact nozzle as claimed in claim 1 which comprises a wear-resistant bushing fitted in the frame so as to receive the welding electrode emerging from between said contact member and said backing member.

3. A contact nozzle as claimed in claim 1 which comprises at least one wear-resistant bushing fitted in the frame so as to guide the welding electrode into a gap between said backing member and said contact member.

* * * * *